Patented Sept. 1, 1925.

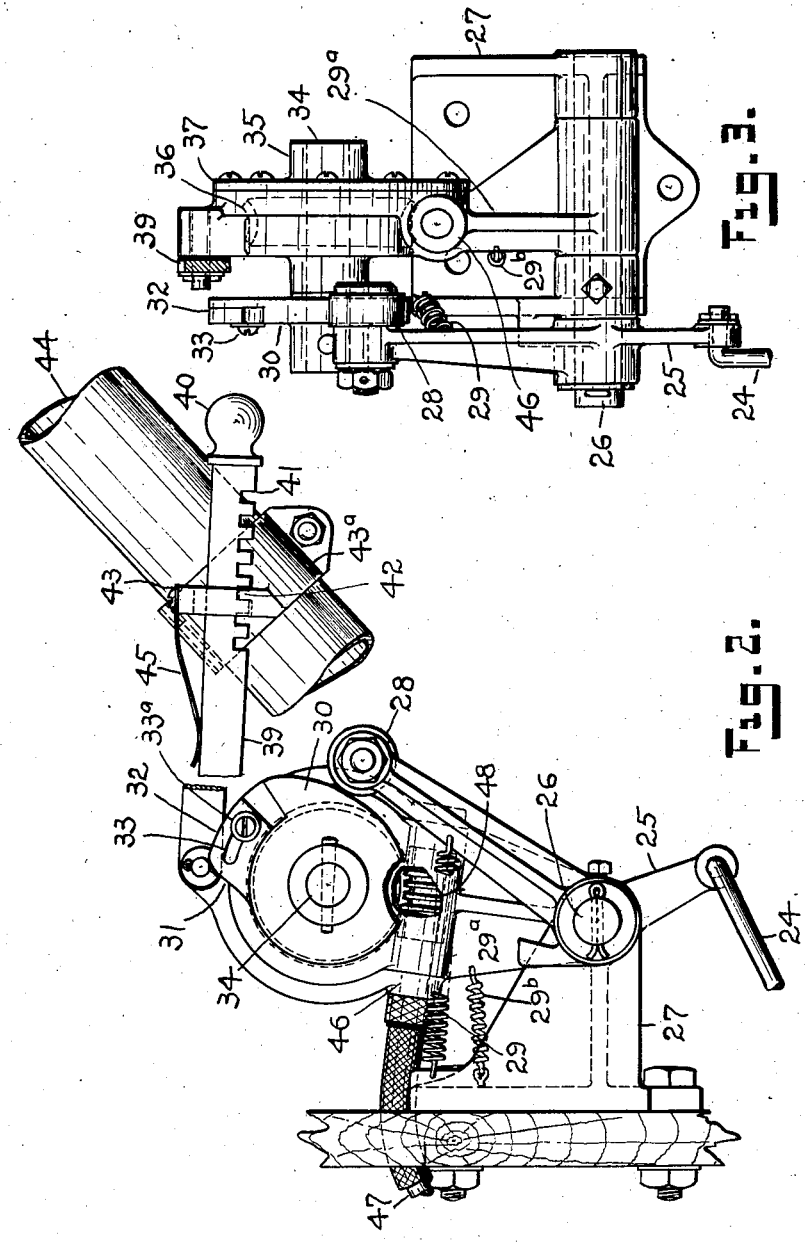

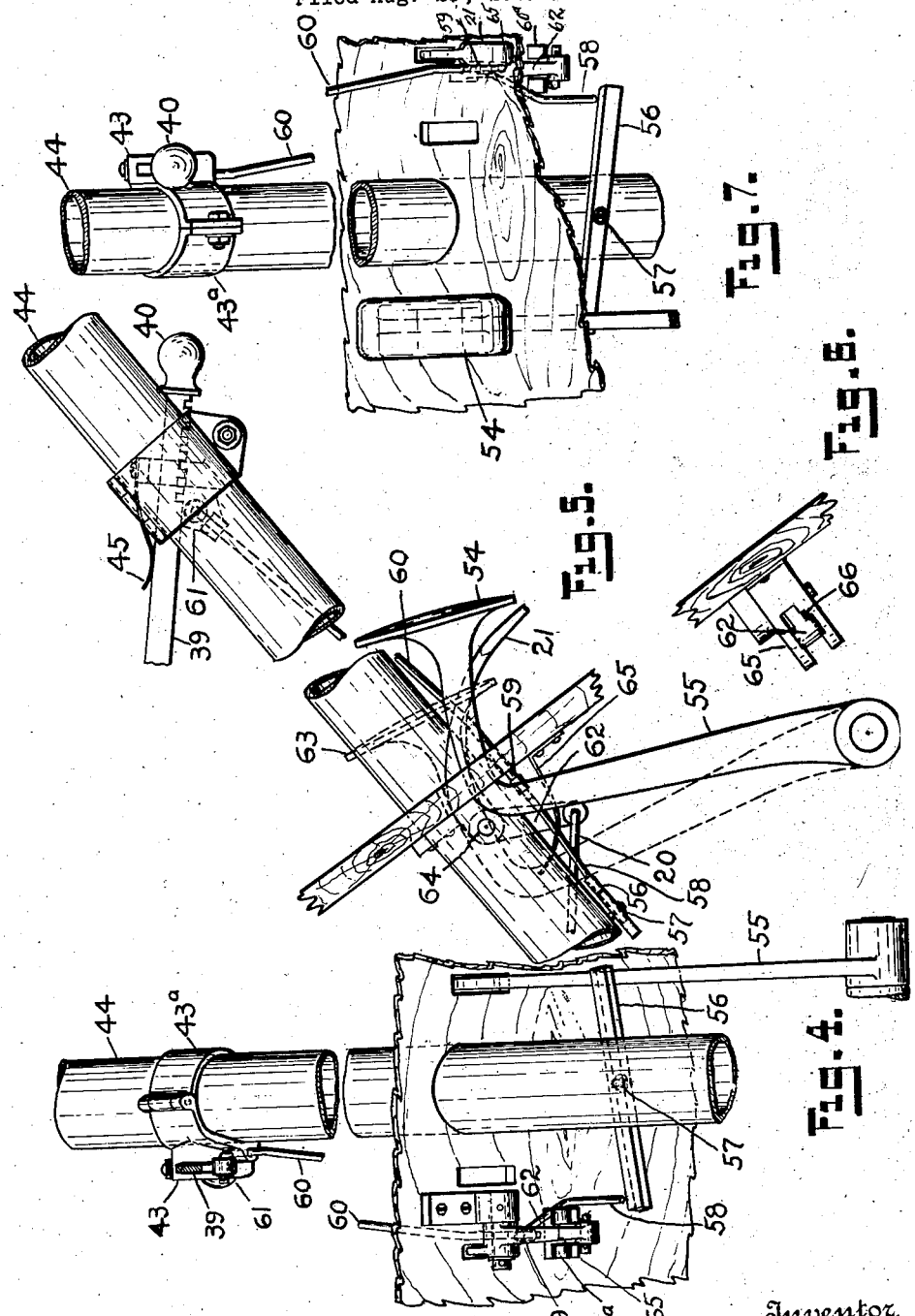

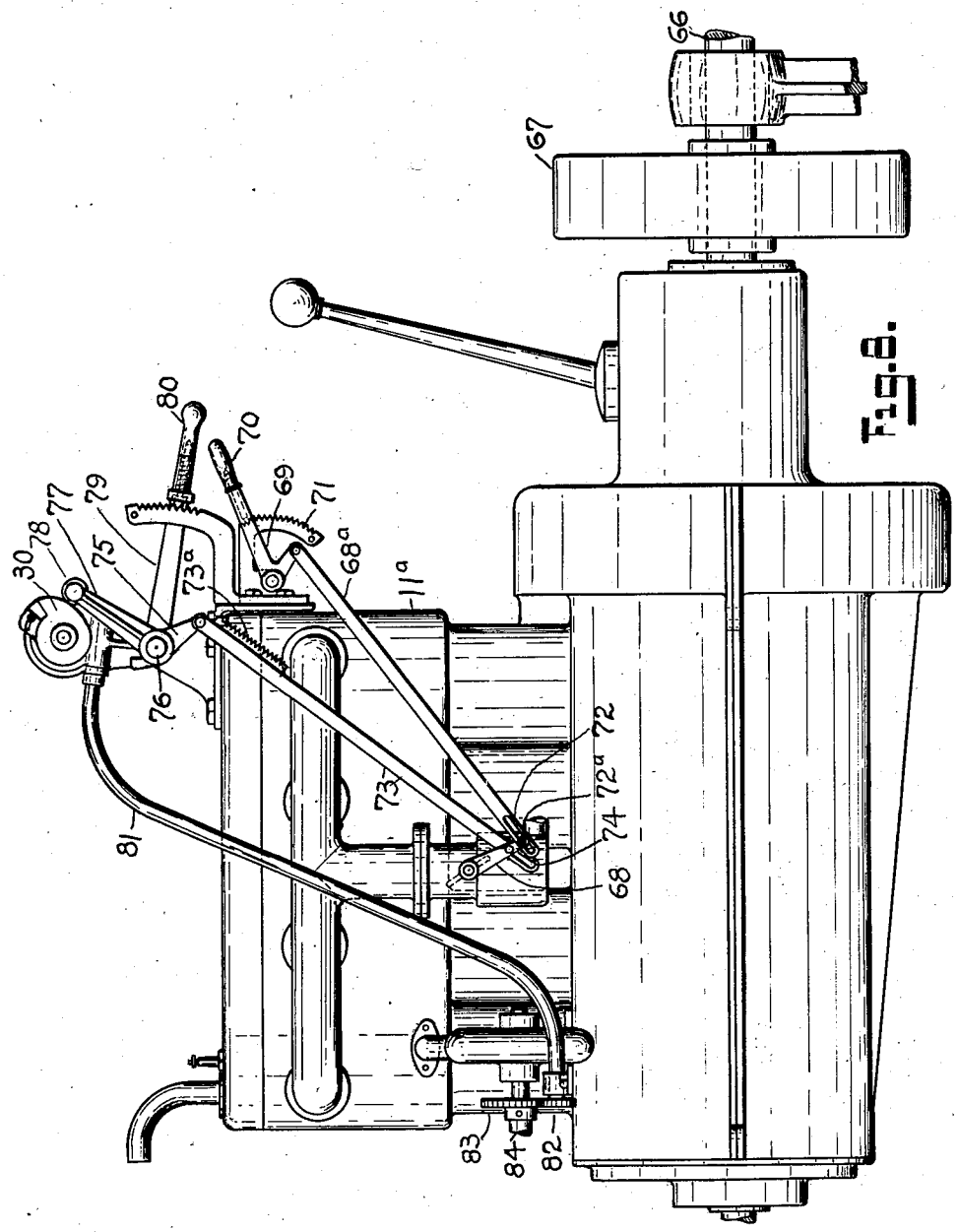

1,552,138

UNITED STATES PATENT OFFICE.

ETTORE FRANK GIANNATTASIO, OF NEW YORK, N. Y.

AUTOMATIC FUEL CONTROL.

Application filed August 29, 1923. Serial No. 659,900.

*To all whom it may concern:*

Be it known that I, ETTORE F. GIANNATTASIO, a citizen of the United States, and a resident of the city, county, and State of New York, have invented an Improvement in Automatic Fuel Controls, of which the following is a specification.

My invention relates to improvements in an automatic fuel control which can be applied to any form of motor, and which is intended to act automatically to reduce the consumption of fuel, and therefore to enable work to be done with greater economy than heretofore. While my invention is applicable to fuel consuming motors of all kinds, it is especially valuable in connection with motors which are used to drive moving vehicles of some kind, such as automobiles, motor boats, marine engines, aeroplane engines, and the like. I have found that generally speaking a motor will generate enough power when running at speed so that if the fuel supply is cut off momentarily and periodically, the motor will continue to run by inertia during this period, thereby saving the fuel which would otherwise be used during such period. If a fly-wheel is applied to the driving shaft or some other part connected with the motor, obviously this will increase the inertia, and on vehicles, the movement of the vehicle itself will also tend to increase the said inertia. In carrying out my invention I arrange means for cutting out the fuel supply as stated for predetermined intervals, and I also provide means whereby the periods during which the supply is cut off may be regulated and predetermined. When applied to most engines, my invention does automatically and to better advantage, what is sometimes done manually. For instance a driver will throttle down his gas supply where a fuel supply is not needed, and will open it up to a greater extent at intervals; but with my device the work is done automatically and systematically, and I also provide means whereby when desired, the automatic fuel control may be thrown out of gear, and the engine or motor controlled precisely as usual. All of which will be better understood from the description which follows.

Reference is to be had to the accompanying drawings forming a part of this specification, in which similar reference characters indicate corresponding parts in all the views.

Figure 2 is a broken enlarged detail elevation of the immediate means for periodically cutting out the fuel supply.

Figure 3 is a view partly in section taken at right angles to the view shown in Figure 2.

Figure 4 is a fragmentary detail showing automatic means for throwing the fuel cut-out mechanism out of gear by the action of the clutch lever or the accelerator lever.

Figure 5 is a broken side elevation of the structure shown in Figure 4.

Figure 6 is a detail of the guide for the accelerator lever.

Figure 7 is a view similar to Figure 4 but taken from the opposite side of the dash, and Figure 8 shows the application of the invention to a stationary engine of the marine type.

Figure 1:
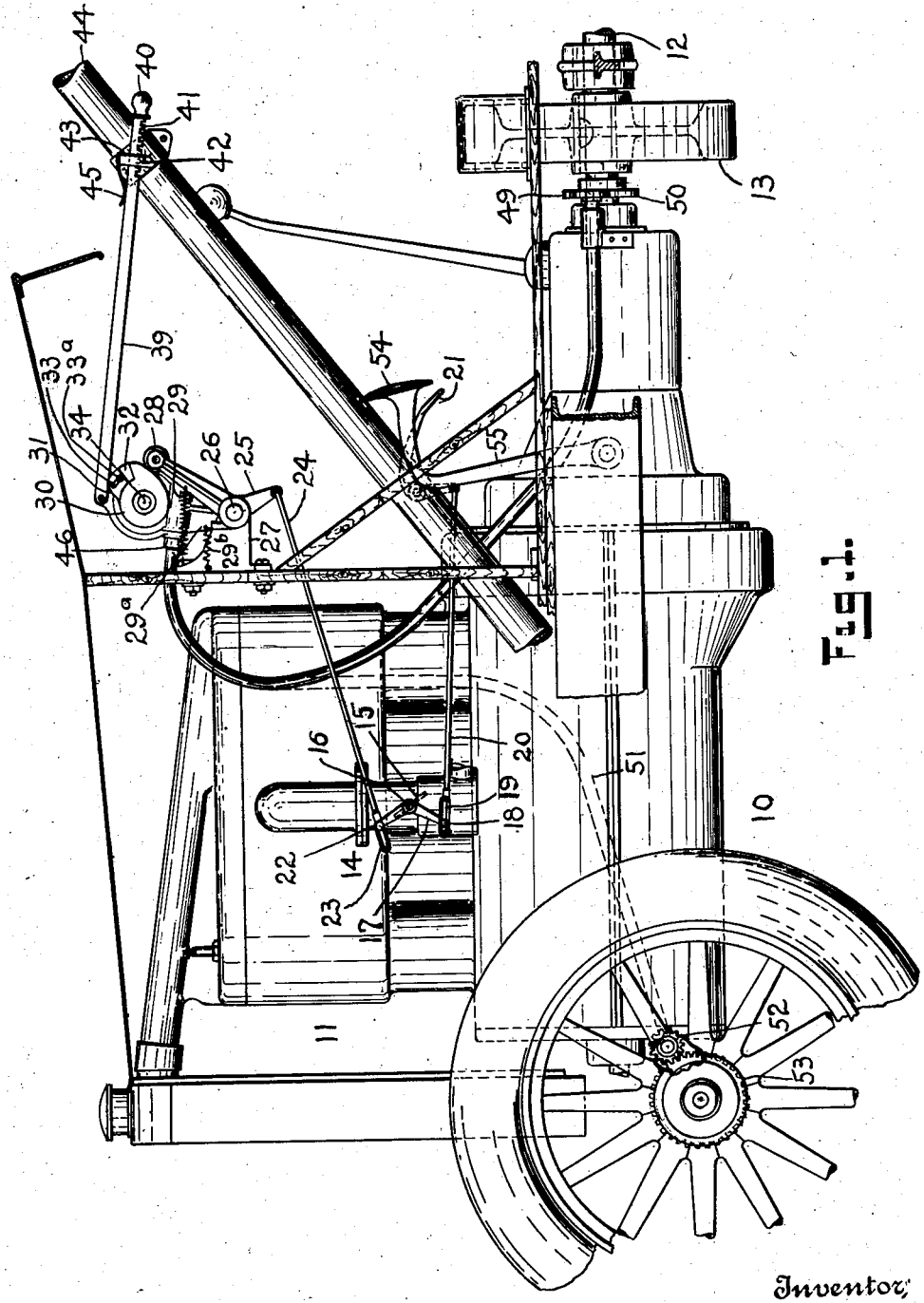
Figure 1 is a broken side elevation partly diagrammatic, of a motor car provided with my improvements.

In the drawings I have shown the application of my invention to a motor car, a use to which it is particularly adapted, although it may be applied to any engine and for any engine purpose. As illustrated the motor 10 may be of any approved type, and it has an engine 11 which is shown as a conventional engine having the propeller or driving shaft 12 to which is attached a fly-wheel 13. This fly-wheel increases the inertia of the propeller shaft when the fuel supply is cut off, but it may or may not be used as desired.

In Figure 1 I have shown a conventional carbureter 14 having a throttle valve 15 on the shaft 16, which is controlled by a bell crank lever 17, one end of which connects as shown at 18 with the slotted end 19 of a rod 20 which connects with the accelerator pedal 21, so that this may be used as usual to control the throttle valve. The opposite end of the lever 17 connects as shown at 22 with the slotted end 23 of a rod 24, and this is pivoted to the lower arm of the bell crank 25 on the shaft 26, this being illustrated as supported on a bracket 27 attached to the dash board of the car. The upper arm of the bell crank carries a roller 28, and this is normally pulled by the spring 29 into close contact with the rotating cam 30. The cam 30 has a shoulder 31 over which the roller 28 rides, and this shoulder is adjustable back and forth as shown in Figure 2 to regulate the length of the cam surface. This result might be attained in various ways, but as shown the shoulder 31 is produced on an extension 32 which is slotted as shown at 33 to receive the fastening screw 33ª by which the extension 32 is fastened to a corresponding part of the cam. The cam is carried by a shaft 34. It will be seen that as the cam rotates, it will gradually tilt the bell crank 25 and push the rod 24 in position to gradually throttle down and thereby close the valve 15; but when the roller 28 rides over the shoulder 31, the spring 29 returns the bell crank to its original position and opens the valve 15, so that with the parts in the position shown in Figures 1 and 2, the engine will be first running at speed, and gradually the fuel supply is cut off until it entirely ceases to flow, after which the valve will be opened up and the engine will function as before. It will also be noticed that if steam or other pressure fluid is used instead of gas, the action will be exactly the same, and in using the term "fuel supply", I mean to include any fuel control, whether the action is directly on the fuel as when gas is used, or indirectly as when steam or other pressure fluid is used.

The shaft 34 is mounted in a bearing 35 which is supported on a swinging bracket 29ª, and this is pivoted on the shaft 26 as shown, so that if the cam and bracket 29ª were released, they would be pulled back by the spring 29ᵇ out of engagement with the roller 28, and the engine would function precisely as usual, and without the cut-out. I therefore provide for controlling this arrangement so that the cam may be brought into close engagement with the roller 28, or moved back so as to be entirely out of engagement. As a convenient means of doing this the cam is connected with the housing 37 in which is a gear wheel 36 which is secured to the shaft 34, and the housing is pivotally connected with an adjusting rod 39 which can obviously be extended to any point where it can be conveniently reached and worked. As illustrated, the rod is intended for use on a car, and it has a handle 40 at its free end, and a rack 41 near its free end and on the under side, which engages a fixed latch 42 in the lower part of the keeper 43 through which the rod 39 runs. The keeper is shown attached by means of a clamp strap 43ª to the steering post 44 of the vehicle, and the spring 45 presses down on the rod 39 so as to hold the rack in engagement with its latch. Obviously by grasping the handle 40 and lifting the rod 39 against the tension of the spring 45, the rod may be moved back and forth so as to adjust the cam for the purpose already described.

The gear wheel 36 above referred to meshes with and is driven by a worm wheel 48 contained in the lower part 46 of the gear case, and the worm is driven by a flexible shaft 47 which can connect with any convenient part of the engine or part driven thereby. As shown in Figure 1, the shaft connects by gears 49 and 50 with the propeller or drive shaft 12, but if desired the flexible shaft may be extended as shown by dotted lines at 51, and connected by gears 52 and 53 with the front wheel of the car. However, the means of driving the cam is immaterial so long as it is rotated as specified.

Where the invention is used on motor cars, it is desirable to have the automatic fuel cut out thrown out of gear at certain times, as for instance when a clutch is operated and the car stopped, or in case of accident, and to this end I have shown details in Figures 4 to 7, which add to the efficiency of the device. As here illustrated the clutch pedal 54 is of conventional type and attached to the usual lever 55, and when it is pushed in to operate the clutch, it strikes and tilts a lever 56 which is pivoted as shown at 57 on the steering post 44 or other convenient support, and the opposite end of the lever strikes the lower end of the rod 58, thus moving the rod lengthwise to disengage the rod 39 from its latch 42 and permit the spring 29ᵇ to pull the cam 30 out of engagement with the roller 28. This is accomplished by reason of the fact that the rod 58 connects by a coupling 59 with a rod 60 which extends in a direction generally parallel with the steering post 44, and has at the top a roller 61 which lies directly under the rod 39, and consequently when the rod 60 is moved vertically as shown, it will act as stated on the rod 39, and when the accelerator pedal 21 is slowly released, it lodges against the shoulder 66 of the guide 65, but if said pedal 21 is either quickly released or snapped away from the shoulder 66 by either shock or otherwise, it then will travel to the full length of the guide 65 thus pushing the lever 39 against the finger spring 45 and simultaneously the whole mechanism is pulled away from the roller 28 by the spring 29ᵇ, and the throttle lever of the carbureter is consequently closed. The rod 20 connected to the accelerator 21 is provided with a slot 23. The slots are provided so that when the bell crank 25 is functioning, the accelerator lever 21 is inoperable, and when the accelerator lever 21 is operating, the bell crank 25 is inoperable.

It is also desirable to have the rod 39 under certain conditions thrown out of engagement with its rack by the action of the accelerating lever 62. This is shown in a conventional way connected with a pedal 21, and pivoted to a support as at 64. It moves in a slotted guide 65 which is attached to a convenient support which in the present instance is the back of the dashboard, and the guide has a shoulder 66 which will first engage the accelerator lever 62 as the latter springs back to place when the foot is taken off the pedal. An extension 60ᵃ of the rod 60 extends downward into the path of this lever 62 as shown in the drawings. When the pressure on the pedal 21 is substantially released, the lever 62 springs back slowly, it will first engage the shoulder 66 of the guide 65, and will not act to entirely throw the fuel cut-out or control out of gear; but if the pressure on the pedal is quickly or entirely released, the lever 62 will spring back to the full extent of the slot in the guide 65, and thus release the rod 39 sufficiently to entirely release the cam gear. This is because there is more or less wobble always in the member 62, and while it will first engage the shoulder 66, it will escape from the shoulder if the pressure is quickly or entirely released as the case may be.

In Figure 8 I have shown the application of the invention to a stationary engine, but one of the marine type. The invention, however, is universally applicable to motors or engines of all kinds. As illustrated in Figure 8, the engine 11ᵃ has a driving shaft 66 which is shown provided with a fly-wheel 67, but as already stated in other instances, this may or may not be used, although its use is preferable because it gives increased inertia to the moving parts of the engine. The throttle valve of the engine is controlled by a crank 68, and the rod 68ᵃ connects with this crank, the rod being at its outer end pivoted to a bell crank 69 which has a handle 70 and is adjustable in the usual way upon a quadrant 71. The inner end of the rod 68ᵃ is slotted as shown at 72 to provide for a certain lost motion and permit the roller 72ᵃ on the crank 68 to slide in the slot. This is the conventional way of opening and closing the throttle valve. My attachment is applied in substantially the manner already indicated, but may be modified somewhat owing to the different types of engines. The rod 73 has a slotted connection as shown at 74 with the crank 68, and the outer end of the rod is normally pulled out by the spring 73ᵃ. The rod 73 is pivoted to a crank 75 on the shaft 76, the latter being suitably supported and having the crank 77 carrying a roller 78 which rides on the surface of the rotating cam 30 like that already described. The cam is driven by a flexible shaft 81, which in the present instance is driven by gears 82 and 83, connecting with the pump shaft 84 of the engine, but obviously the connection might be with any other suitable moving part of the engine or mechanism driven thereby.

The foregoing examples make it clear that my attachment when applied to an engine will at definite and regulable periods cut out the motive supply of the engine whether it be pressure fluid, gas, or otherwise, and permit the engine to run during this interval on its acquired inertia; but this period may be made short enough so that the speed of the engine will not be slackened, as the motive supply will be cut in again before such slackening can take place. I am therefore able to use the energy of inertia as potential, and operate the engine or motor on less fuel consumption than heretofore. It will be apparent that while I have shown a structure which enables my invention to be carried into effect, and which is preferably used, and I do not wish to limit myself to the exact construction illustrated in the drawings and described in the specification, as many other forms of mechanism may be utilized without departing from the principle of the invention.

I claim:—

1. In combination with a motor, means for periodically cutting out the fuel supply thereto during the normal operation of the motor, said means being operated by the motor.

2. In combination with a motor, means for periodically cutting out the fuel supply thereto during the normal operation of the motor, whereby only sufficient fuel is supplied to the motor to accomplish the work required, said means being operated by said motor.

3. In combination with a motor, means for periodically cutting out the fuel supply thereto during the normal operation of the motor, said means being operated by the motor, and manually operated means for placing the before mentioned fuel cut-out means into and out of operative position.

4. A motor provided with the usual throttle, and a cam mechanism operated by the motor for periodically cutting out the fuel supply to said motor during the normal operation of the motor.

5. A motor provided with the usual throttle, and a cam mechanism operated by the motor for periodically cutting out the fuel supply to said motor during the normal operation of the motor, and means for varying the operating surface of the cam whereby to vary the periods in which the fuel supply is cut off from the motor.

6. A motor, a throttle, means for controlling the throttle valve, and independently acting means to automatically close the throttle valve whereby the motor will run by inertia while the throttle is closed.

7. A motor, a tilting lever to control the power supply to the motor, a rotatable cam to engage and tilt the lever, said cam being hung on a movable support, and manually operated means to move said support and carry the cam out of engagement with the lever.

8. A motor, a tilting lever to control the power supply to the motor, a rotatable cam mounted on a movable support and arranged to actuate the lever, and adjustable means to fix the position of the cam with relation to the lever.

9. A motor, a tilting lever arranged to cut off the power supply to the motor, a rotatable cam to actuate the lever, and a flexible drive mechanism driven by the motor and connected to the cam.

10. In combination, an auto-motive vehicle, a motor and a clutch pedal therefor, automatic means for periodically cutting off the power supply to the motor, and means actuated by the movement of the clutch pedal to render the aforesaid cut-off means inoperative.

11. In combination, an auto-motive vehicle, a motor therefor, a clutch pedal, mechanism to cut off the power supply to the motor, a cam mechanism arranged to periodically actuate the aforesaid cut-off mechanism, and means actuated by the clutch pedal to displace the aforesaid cam mechanism.

12. In combination, an auto-motive vehicle, a motor therefor, a tilting lever to cut off the power supply to the motor, a rotatable cam to actuate the lever, means for removing the cam from engagement with the lever, and a flexible driving connection between the cam and a movable part of the vehicle.

13. In combination, an auto-motive vehicle having an accelerator and motor, means for periodically and automatically cutting off the power supply to the motor, and means actuated by the movement of the accelerator to render the aforesaid cut-off means inoperative.

14. In combination, an auto-motive vehicle, a motor therefor, a clutch pedal therefor, an accelerator, automatic means for periodically cutting off the power supply to the engine, and means operatively connected to the clutch pedal and accelerator whereby the cut-off means can be rendered inoperative by the movement of either said clutch pedal or accelerator.

15. In combination, a motor, a tilting lever controlling the power supply to the motor, a rotatable cam actuating the tilting lever to periodically cut off the power supply, said cam being pivotally supported and normally out of engagement with the lever, and manually operated means for fixing the relative positions of the cam and lever.

In testimony whereof, I have signed my name to this specification this 28th day of August, 1923.

ETTORE FRANK GIANNATTASIO.